(12) United States Patent
Sakanashi et al.

(10) Patent No.: US 8,804,206 B2
(45) Date of Patent: Aug. 12, 2014

(54) IMAGE PROCESSING DEVICE

(71) Applicant: Murata Machinery, Ltd., Kyoto (JP)

(72) Inventors: Yasuhiro Sakanashi, Kyoto (JP); Yoshiharu Kuroda, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 50 days.

(21) Appl. No.: 13/645,569

(22) Filed: Oct. 5, 2012

(65) Prior Publication Data

US 2013/0094066 A1    Apr. 18, 2013

(30) Foreign Application Priority Data

Oct. 18, 2011 (JP) ................................. 2011-228515
Oct. 18, 2011 (JP) ................................. 2011-228516

(51) Int. Cl.
*H04N 1/04* (2006.01)
*H04N 1/193* (2006.01)
*H04N 1/12* (2006.01)
*H04N 1/10* (2006.01)

(52) U.S. Cl.
CPC ...... *H04N 1/1013* (2013.01); *H04N 2201/0454* (2013.01); *H04N 2201/0094* (2013.01); *H04N 1/193* (2013.01); *H04N 1/12* (2013.01)
USPC ............ 358/474; 358/448; 358/449; 358/497

(58) Field of Classification Search
CPC combination set(s) only.
See application file for complete search history.

(56) References Cited

U.S. PATENT DOCUMENTS

| | | | | |
|---|---|---|---|---|
| 5,152,514 A * | 10/1992 | Meetze | ......................... | 271/3.01 |
| 5,158,221 A * | 10/1992 | Hashimoto et al. | ........... | 226/110 |
| 5,973,797 A * | 10/1999 | Tanaka et al. | ................. | 358/488 |
| 6,272,297 B1 * | 8/2001 | Kobayashi | ....................... | 399/82 |
| 6,314,267 B1 * | 11/2001 | Kida | ............................. | 399/405 |
| 7,355,764 B2 * | 4/2008 | Ooshima et al. | .............. | 358/488 |
| 7,496,315 B2 * | 2/2009 | Mase | ............................ | 399/111 |
| 7,813,010 B2 * | 10/2010 | Michiie et al. | ................ | 358/474 |
| 8,279,459 B2 * | 10/2012 | Ohmiya | ....................... | 358/1.12 |
| 8,363,286 B2 * | 1/2013 | Ikeno et al. | .................... | 358/474 |
| 2002/0074708 A1 | 6/2002 | Nagata et al. | | |
| 2004/0114958 A1 * | 6/2004 | Katsuyama et al. | .......... | 399/107 |
| 2009/0310186 A1 | 12/2009 | Nakai et al. | | |
| 2012/0321365 A1 * | 12/2012 | Sendo et al. | ................... | 399/410 |

FOREIGN PATENT DOCUMENTS

| | | |
|---|---|---|
| JP | 02-120440 U | 9/1990 |
| JP | 08-106192 A | 4/1996 |
| JP | 2002-179320 A | 6/2002 |
| JP | 2004-194049 A | 7/2004 |
| JP | 2004-205918 A | 7/2004 |
| JP | 2004-357159 A | 12/2004 |
| JP | 2009-300878 A | 12/2009 |

* cited by examiner

*Primary Examiner* — Dung Tran
(74) *Attorney, Agent, or Firm* — Keating & Bennett, LLP

(57) ABSTRACT

An image processing device includes an image scanning unit, a first paper feed cassette, and an image recording unit. The image scanning unit scans a document placed on a document scanning surface, which defines a maximum document size. The first paper feed cassette accommodates recording paper of a size up to a first size, which is the same as the maximum document size. The image recording unit records an image on the recording paper. The maximum document size is defined by a scan maximum main scanning length and a scan maximum sub-scanning length that is preferably shorter than the scan maximum main scanning length. A record main scanning direction is parallel or substantially parallel to a long side of the recording paper of the first size accommodated in the first paper feed cassette. A scan main scanning direction is parallel or substantially parallel to the record main scanning direction.

18 Claims, 9 Drawing Sheets

IMAGE PROCESSING DEVICE

CROSS-REFERENCE TO RELATED APPLICATIONS

This application claims priority under 35 U.S.C. 119 to Japanese Patent Application No. 2011-228515 and No. 2011-228516, filed on Oct. 18, 2011, which applications are hereby incorporated by reference in their entirety.

BACKGROUND OF THE INVENTION

1. Field of the Invention

The present invention relates to image processing devices, and in particular, to an image processing device that can scan an image of a document using a Flat Bed Scanner (FBS) method, and record (print) the scanned image on recording paper by an image recording unit to discharge.

2. Description of the Related Art

Conventionally, in a multifunction peripheral having functions of a copying machine, a scanner, a printer, a facsimile, and the like, a type (hereinafter referred to as "A3 machine") that can scan a document of a size up to an A3 size with an image scanning unit, and print output the scanned image on recording paper of a size smaller than or equal to the A3 size is used. In the A3 machine, a document scanning surface, on which the document is placed, is set to a size corresponding to the A3 size, so that the user can cause the image scanning unit to scan the image of the document of A3 size at maximum using the FBS method. Furthermore, in the A3 machine, the user can cause the image scanning unit to scan the image of the document using an Automatic Document Feeder (ADF) (ADF method).

There is also known a multifunction peripheral (hereinafter referred to as "A4 machine") in which the maximum document size that can be scanned through the FBS method is an A4 size and that can perform print output to recording paper of a size smaller than or equal to the A4 size. In such an A4 machine, the document scanning surface is set to a size corresponding to the A4 size. The A3 and A4 sizes are paper sizes defined in the ISO.

The majority of documents and recording paper used in offices and the like are A4 sizes, and the frequency that the documents and the recording paper of A3 size are used is extremely low. However, although the frequency is low, there is a chance of using the documents and the recording paper of A3 size, and thus the A3 machine is relatively commonly used.

In small-scale offices and households, there may not be room to install the A3 machine that requires a large installing area for the A3 size of low usage frequency. Therefore, the demands for the A4 machine, for which the installing area is small, similarly exist.

In such A3 machine and A4 machine (hereinafter referred to as multifunction peripheral A), the rectangular document scanning surface for the FBS is provided to be long in the lateral direction (left and right direction) with respect to the user standing in front of the multifunction peripheral. Thus, in the multifunction peripheral A, a scan main scanning direction when scanning the image of the document (A3, A4) of the maximum document size using the FBS method and the ADF method is set to the short side direction of the document, and a scan sub-scanning direction is set to the long side direction of the document. In other words, constituent components (e.g., mirror and scan head) of the image scanning unit relatively move in the long side direction of the document with respect to the document to scan the image of the document.

In the multifunction peripheral A, the maximum recording paper size of the recording paper accommodated in a paper feed cassette is the same size as the maximum document size that can be scanned by the FBS method. In the image recording unit for recording (printing) the scanned image of the document, the record main scanning direction when recording on the recording paper of the maximum recording paper size is set to the short side direction of the recording paper, and the record sub-scanning direction is set to the long side direction of the recording paper. In other words, the recording paper is handled in the longitudinal direction, and the image is recorded (printed) on the recording paper using a photoconductive drum and the like.

Similarly to the multifunction peripheral A, the multifunction peripheral in which the rectangular document scanning surface is set to be long in the lateral direction with respect to the user includes a multifunction peripheral (hereinafter referred to as multifunction peripheral B) in which the scan main scanning direction is set to the long side direction of the document of maximum document size placed on the document scanning surface to reduce the time required for scanning. In other words, the constituent components of the image scanning unit relatively move in the short side direction of the document with respect to the document.

In accordance therewith, since the ADF (Automatic Document Feeder) arranged in the multifunction peripheral B is arranged at an end on a non-user side (rear side of the device) on the upper surface of the device, the document placed on the ADF is transported in a direction away from the user (direction towards a rear surface in a depth direction of the device), scanned by the image scanning unit, and then again returned to the user side. In the multifunction peripheral B, the scan main scanning direction is set to the long side direction of the document, and the record main scanning direction is set to the short side direction of the recording paper, similarly to the conventional A3 machine.

The multifunction peripheral A (A3 machine and A4 machine described above) has the scan sub-scanning direction along the long side direction of the document of maximum document size and the record sub-scanning direction along the long side direction of the recording paper of the maximum recording paper size, so that the document is required to be relatively moved by the length of the long side along the scan sub-scanning direction and the record sub-scanning direction at the time of scanning and recording (printing). Thus, a long period of time is required for scanning and recording (printing) to the recording paper per one sheet of document and recording paper. Thus, in the multifunction peripheral A, the usage time of the components used for scanning and recording is long, and the frequency of replacing or performing maintenance on such components becomes high. For example, a light source in the image scanning unit requires a long lighting time, and in the photoconductive drum in the image recording unit, wear advances since the time in which the recording paper is brought into contact becomes long, thus reducing the usable period.

On the other hand, in the multifunction peripheral B, the scanning time can be reduced since the scan sub-scanning direction is set to the short side direction of the document. However, in the multifunction peripheral B, since the record sub-scanning direction is set to the long-side direction of the recording paper, a long period of time is required for the recording on the recording paper. Therefore, the problem of high frequency of replacing or performing maintenance on the components used for the recording cannot be resolved.

In the multifunction peripheral B, the ADF is arranged at the end on the non-user side (rear side of the device) on the upper surface of the device, and thus a new problem arises in that it becomes very troublesome to remove a jammed document when paper jam occurs in the ADF. In particular, if the device is arranged facing the wall, it is difficult to access the jammed document and thus the maintenance performance is extremely bad.

SUMMARY OF THE INVENTION

In view of the problems described above, preferred embodiments of the present invention provide an image processing device capable of promptly executing a scanning process of a document and a recording process to recording paper, and capable of extending a lifespan of components of an image scanning unit and an image recording unit.

An image processing device according to a preferred embodiment of the present invention includes an image scanning unit, a first paper feed cassette, and an image recording unit. The image scanning unit scans an image of a document by repeating scanning of an image of a document in a scan main scanning direction while moving a moving mechanism in a scan sub-scanning direction with respect to the document placed on a document scanning surface, which defines a maximum document size that can be scanned by a scan maximum main scanning length and a scan maximum sub-scanning length that is preferably shorter than the scan maximum main scanning length. The first paper feed cassette can accommodate recording paper of a size up to a first size. The first paper feed cassette accommodates the recording paper of the first size so that alongside of the recording paper is parallel or substantially parallel to a record main scanning direction. The image recording unit records the image on the recording paper by repeating recording of the image in a record main scanning direction that is parallel or substantially parallel to the scan main scanning direction while moving the recording paper supplied from the first paper feed cassette in a record sub-scanning direction.

According to a preferred embodiment of the present invention configured as above, since the scan maximum main scanning length is preferably longer than the scan maximum sub-scanning length, the distance in which the image scanning unit of the image scanning unit physically moves in the scan sub-scanning direction in the scanning process is short and the processing time on the scanning process is reduced as compared to the case where the scan maximum sub-scanning length is set longer than the scan maximum main scanning length. The lifespan of the constituent components in the image scanning unit thus becomes longer.

In a preferred embodiment of the present invention, the recording paper of the first size is accommodated in the first paper feed cassette such that the long side of the recording paper is parallel or substantially parallel to the record main scanning direction, and thus the recording process is carried out with the long side of the recording paper of the first size (maximum recording paper size in the first paper feed cassette) along the record main scanning direction and the short side of the recording paper along the record sub-scanning direction. Accordingly, the distance in which the recording portion (e.g., photoconductive drum, inkjet head, or the like) of the image recording unit relatively moves in the record sub-scanning direction with respect to the recording paper is thus short and the processing time for the recording process is reduced as compared to the case where the recording process is carried out with the short side of the recording paper of the maximum recording paper size along the record main scanning direction and the long side of the recording paper of the maximum recording paper size along the record main scanning direction. Accompanied therewith, the lifespan of the constituent components in the image recording unit becomes longer.

Furthermore, in a preferred embodiment of the present invention, since the scan main scanning direction is preferably parallel or substantially parallel to the record main scanning direction, the arrangement direction of the image scanning unit and the image recording unit is aligned. Therefore, the image scanning unit and the image recording unit are aligned in the vertical direction, and the device size can be miniaturized.

The image processing device according to a preferred embodiment of the present invention is further preferably configured as described below. That is, the scan main scanning direction and the record main scanning direction are arranged to extend along a depth direction from a front surface of the image processing device, on which side a user stands during use, towards a rear surface. According to a preferred embodiment of the present invention configured in such a manner, the width in the left and right direction becomes short while having the width in the depth direction identical in the device size with respect to the multifunction peripheral corresponding to a size greater than the first size.

The image processing device according to a preferred embodiment of the present invention is more preferably configured as below. That is, the image processing device includes an operation unit that inputs or displays setting information, and is arranged on a short side in the document scanning surface.

The image processing device according to a preferred embodiment of the present invention is more preferably configured as below. That is, the first size is the same as the maximum document size. According to a preferred embodiment of the present invention configured in such a manner, since the maximum document size and the maximum recording paper size (first size) are the same size, the sizes of the image scanning unit and the image recording unit are the same. Moreover, the image scanning unit and the image recording unit are arranged in a stacked manner in the vertical direction, so that the device size is miniaturized.

The image processing device according to a preferred embodiment of the present invention is more preferably configured as below. That is, the maximum document size and the first size preferably are a Letter size or an A4 size, for example. According to a preferred embodiment of the present invention configured in such a manner, since the maximum document size and the first size preferably are the Letter size or the A4 size, the installing area can be suppressed and the device size can be miniaturized while corresponding to the document and the recording paper of the Letter size, which is normally used in offices and the like.

The image processing device according to a preferred embodiment of the present invention is more preferably configured as below. That is, an automatic document feeder that transports a document larger than the maximum document size in the scan sub-scanning direction with respect to the image scanning unit is further provided. According to a preferred embodiment of the present invention configured in such a manner, the automatic document feeder (ADF) that can transport the document in the same direction as the scan sub-scanning direction in the FBS method is operated with respect to the image scanning unit to scan the document of the size larger than the document of the maximum document size that can be scanned by the FBS method. For example, in a preferred embodiment of the present invention, when the maximum document size is the A4 size, the document of the A3 size is scanned by the ADF method if the document of the A3 size is to be scanned by the image scanning unit. Therefore, in a preferred embodiment of the present invention, although the scanning processing corresponding to the A3 size can be carried out, the device is configured to the size corresponding to the A4 size, which is smaller than the A3 size.

The image processing device according to a preferred embodiment of the present invention is more preferably configured as below. That is, the image processing device further includes a manual paper feeding tray that transports recording paper larger than the recording paper of the first size that can be accommodated in the first paper feed cassette in the record sub-scanning direction with respect to the image recording unit. According to a preferred embodiment of the present invention configured in such a manner, by using the manual paper feeding tray, the image is recorded (printed) on the recording paper of the size larger than the maximum recording size that can be accommodated in the first paper feed cassette. Furthermore, in a preferred embodiment of the present invention, the recording process is carried out without any drawbacks even if the size of the recording paper, on which the recording (printing) can be performed, is set large with respect to the maximum document size that can be scanned with the FBS method. Therefore, in a preferred embodiment of the present invention, for example, the image processing device is preferably configured to have the device size corresponding to the A4 size, which is smaller than the A3 size, although the recording process corresponding to the A3 size can be carried out.

The image processing device according to a preferred embodiment of the present invention is more preferably configured as below. That is, a second paper feed cassette can accommodate recording paper of a size up to a second size, which is larger than the maximum document size. Furthermore, the second paper feed cassette includes a projecting portion, which projects out in a horizontal direction farther than a device main body including the image scanning unit and the image recording unit in plan view.

The image processing device according to a preferred embodiment of the present invention is more preferably configured as below. That is, the image processing device includes an automatic document feeder and a finisher device. The automatic document feeder is arranged at an upper portion of the document scanning surface to cause the image scanning unit to scan the image of the document by transporting the document. The finisher device is arranged at an upper portion of the projecting portion, and processes the recording paper discharged from the image recording unit.

According to a preferred embodiment of the present invention configured in such a manner, since the size (first size, corresponding to A4 size for example) of the document scanning surface is preferably smaller than the second paper feed cassette that accommodates the recording paper of a large second size (e.g., A3 size), a space is provided on the second paper feed cassette thus enabling the finisher device to be received in such a space. Therefore, the finisher device can be arranged in the device main body without enlarging the installing area of the device.

Furthermore, in a preferred embodiment of the present invention, the document of the second size cannot be scanned by the FBS method since the document scanning surface is preferably smaller than the second size, but the document of the second size can be scanned by using the automatic document feeder (ADF) instead. Furthermore, since the configuration of the image scanning unit related to the FBS method is miniaturized, the manufacturing cost can be reduced.

The image processing device according to a preferred embodiment of the present invention is more preferably configured as below. That is, the second paper feed cassette is configured to supply the recording paper of the second size to the image recording unit when the image scanning unit scans the image of the document of the second size transported from the automatic document feeder. According to a preferred embodiment of the present invention configured in such a manner, when the image of the document of the second size is scanned by the ADF, the recording paper of the second size is supplied from the second paper feed cassette, and the scanned image is recorded on the recording paper of the second size. In a preferred embodiment of the present invention, the recording paper of the desired size is supplied from the first paper feed cassette or the second paper feed cassette when the document of the second size is subjected to reduced scale copy.

The image processing device according to a preferred embodiment of the present invention is more preferably configured as below. That is, the document scanning surface is arranged such that a longitudinal direction of the document scanning surface extends along the depth direction from a front surface of the image processing device, on which side a user stands during use, towards a rear surface. The projecting portion projects out to one side in a left and right direction of the device main body facing the front surface of the image processing device. According to a preferred embodiment of the present invention configured in such a manner, the device main body and the finisher device are arranged in parallel or substantially parallel in the left and right direction of the device.

The image processing device according to a preferred embodiment of the present invention is more preferably configured as below. That is, the first size preferably is a Letter size or an A4 size, and the second size is a Ledger size or an A3 size. According to a preferred embodiment of the present invention configured in such a manner, image processing device has the size of the Ledger machine or the A3 machine, and also includes the finisher device. The FBS method is adapted to the document of the Letter size or the A4 size used at high frequency, and the document of the Ledger size or the A3 size used only at low frequency is scanned by the ADF method, and hence the manufacturing cost can be reduced without lowering the functions of the scanning process.

The image processing device according to a preferred embodiment of the present invention is more preferably configured as below. That is, the automatic document feeder and the finisher device are both arranged on the same side in the left and right direction facing the front surface of the device main body. According to a preferred embodiment of the present invention configured in such a manner, the document and the recording paper from the automatic document feeder and the finisher device are taken out from the same side of the device main body.

The image processing device according to a preferred embodiment of the present invention is more preferably configured as below. That is, the automatic document feeder is arranged on one end side in the left and right direction facing the front surface of the device main body; and an in-body discharging space that accommodates the recording paper discharged from the image recording unit is arranged on the other end side of the device main body. According to a preferred embodiment of the present invention configured in such a manner, the automatic document feeder can be arranged at the upper portion of the portion of high rigidity where the in-body discharging space is not provided in the device main body, and thus the rigidity of the entire device is maintained high.

The image processing device according to a preferred embodiment of the present invention is more preferably configured as below. That is, the automatic document feeder is arranged on one end side in the left and right direction facing the front surface of the device main body; and the finisher device is arranged on the other end side.

The image processing device according to a preferred embodiment of the present invention is more preferably configured as below. That is, the automatic document feeder includes at least a paper feed tray or an output tray. The finisher device includes an extending paper feed tray or an extending output tray to extend a document placing region of the paper feed tray or the output tray.

The scanned document may protrude out from the device main body if the document larger than the document of the first size corresponding to the document scanning surface is scanned by the automatic document feeder. According to a preferred embodiment of the present invention, however, since the finisher device is arranged on the projecting portion with respect to the device main body of the second paper feed cassette, the extending paper feed tray and/or the extending output tray can be arranged in the finisher device. Accordingly, in a preferred embodiment of the present invention, the document of a size larger than the first size is stably held by the extending paper feed tray and the extending output tray.

The image processing device according to a preferred embodiment of the present invention is more preferably configured as below. That is, the finisher device includes an output tray. The output tray includes a downstream end in a paper exit direction of the recording paper that is opened.

The image processing device according to a preferred embodiment of the present invention is more preferably configured as below. That is, the image recording unit includes a photoconductive drum that rotates about a rotation shaft. The record main scanning direction extends along the rotation shaft of the photoconductive drum.

According to the image processing device of various preferred embodiments of the present invention, the manufacturing cost can be reduced and the finisher device can have sufficient functions while maintaining a narrow installing area.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be hereinafter described with reference to the accompanied drawings.

Figure 1:
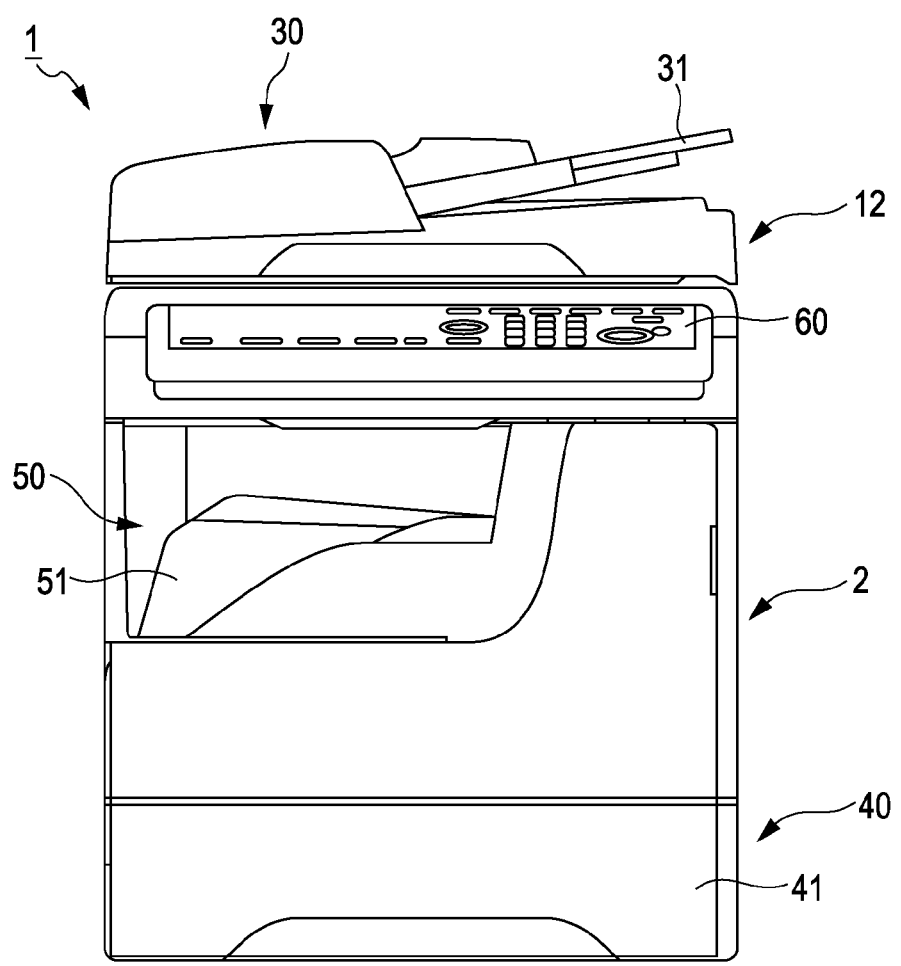
FIG. 1 is a front view of an image processing device according to a first preferred embodiment of the present invention.
Figure 4:
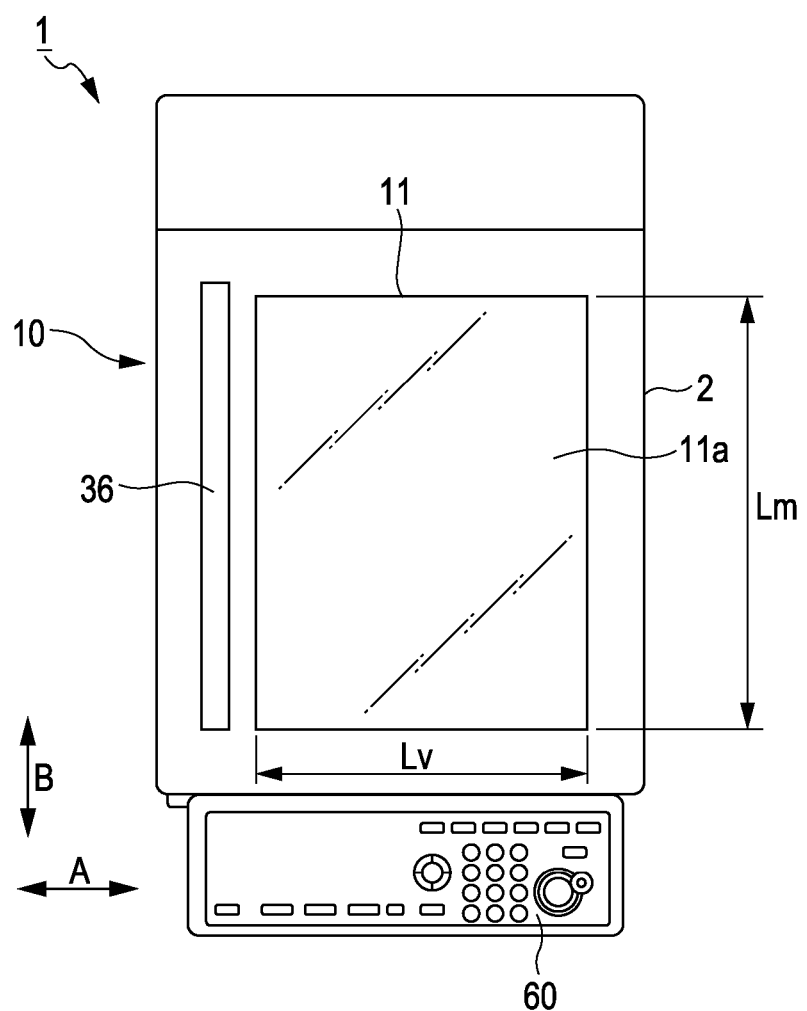
FIG. 4 is a plan view of the image processing device according to the first preferred embodiment of the present invention.
Figure 5:
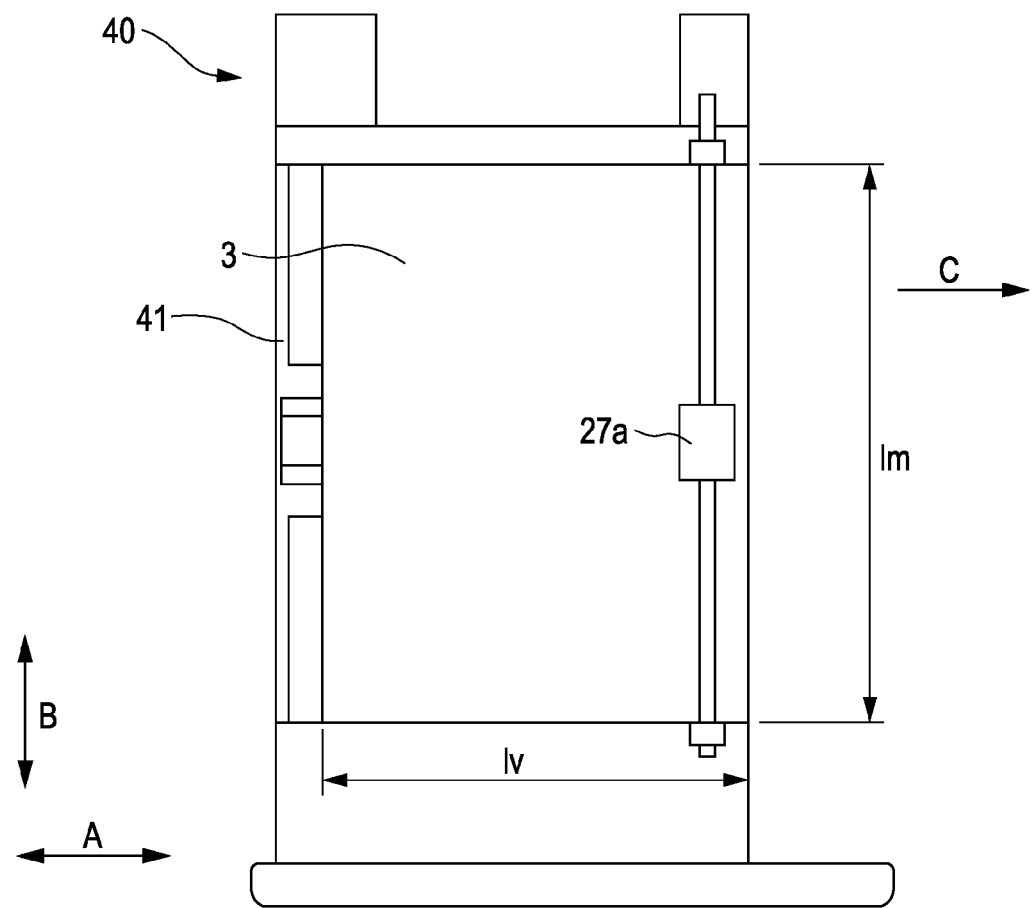
FIG. 5 is an explanatory view of a paper feed cassette according to the first preferred embodiment of the present invention.

First, a first preferred embodiment of the present invention will be described with reference to FIG. 1 to FIG. 5. FIG. 1 is a front view of an image processing device, FIG. 2 is an explanatory view seen from a front side illustrating a structure of the image processing device, FIG. 3 is an explanatory view seen from a right side illustrating the structure of the image processing device, FIG. 4 is a plan view of the image processing device, and FIG. 5 is an explanatory view of a paper feed cassette.

Figure 2:
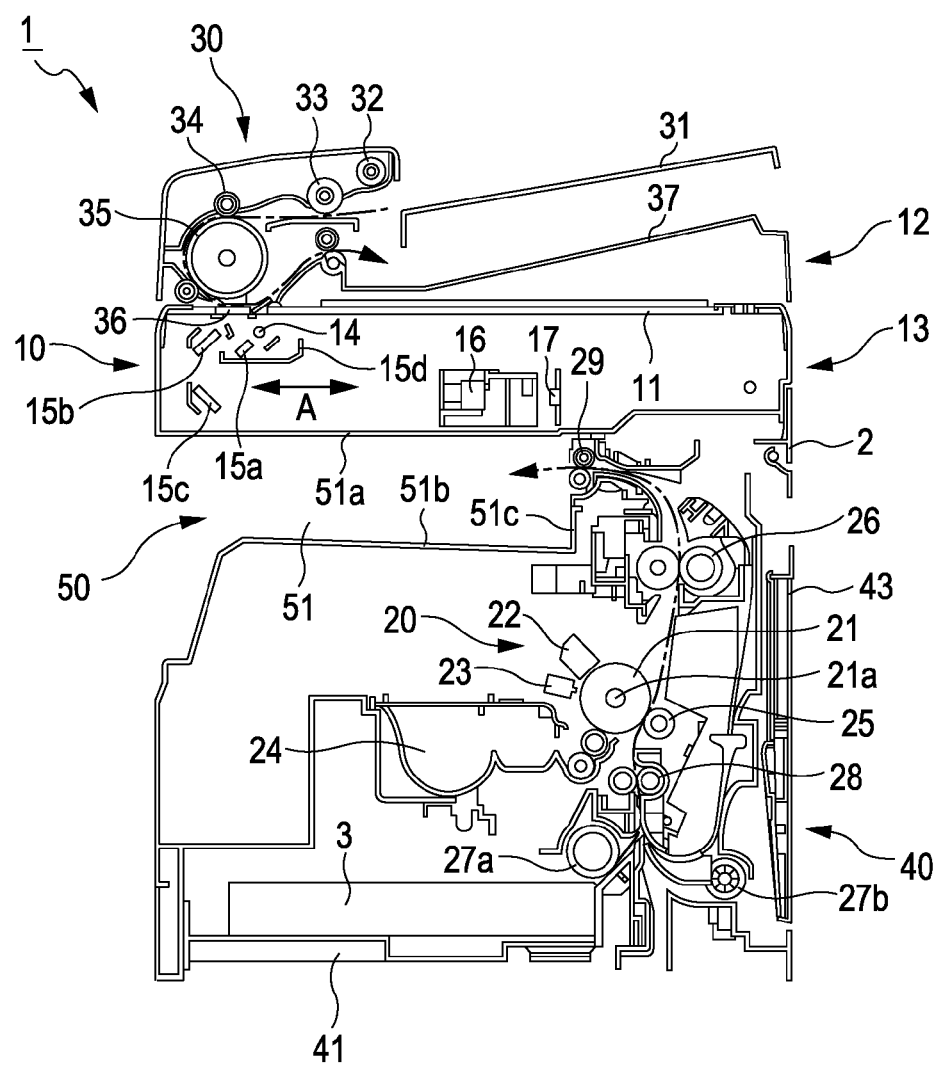
FIG. 2 is an explanatory view seen from a front side illustrating a structure of the image processing device according to the first preferred embodiment of the present invention.
Figure 3:
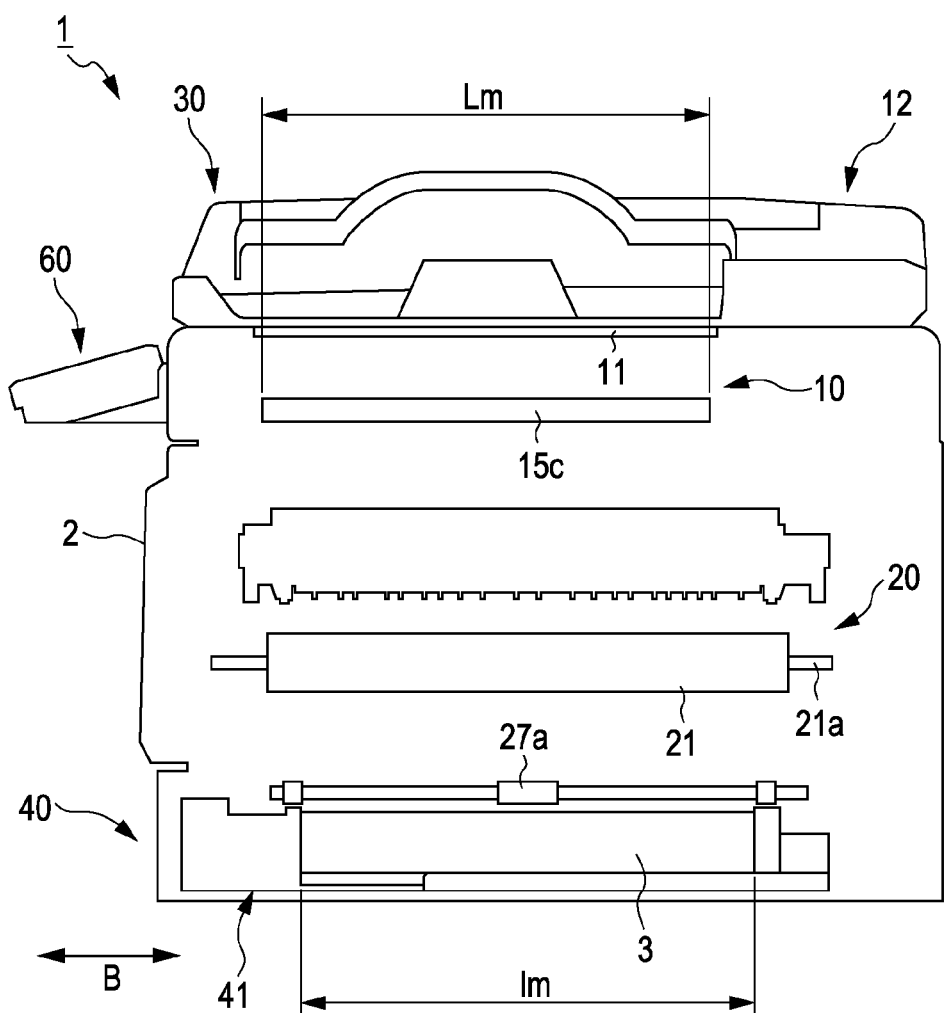
FIG. 3 is an explanatory view seen from a right side illustrating the structure of the image processing device according to the first preferred embodiment of the present invention.

An image processing device 1 of the present preferred embodiment illustrated in FIG. 1 to FIG. 3 is a multifunction peripheral including a copy function, a scanner function, a printer function, a facsimile function, and the like. The image processing device 1 of the present preferred embodiment is adapted to scan an image of a document of an A4 size and record (print) the same on recording paper of A4 size. As illustrated in FIG. 2, the image processing device 1 includes an image scanning unit 10, an image recording unit 20, a document feeding unit 30, a paper feed unit 40, a discharging unit 50, and an operation unit 60. As illustrated in FIG. 1, one portion of the image scanning unit 10, the image recording unit 20, the paper feed unit 40, and the discharging unit 50 are accommodated in a housing (device main body) 2 having a substantially rectangular solid shape.

The operation unit 60 is an operation panel that inputs and displays document size, recording paper size, enlargement/reduction magnification, number of copies, telephone number used as destination of FAX, and the like.

The image scanning unit 10 scans the image of the document, and as illustrated in FIG. 2, the image scanning unit 10 includes a document placing plate 11, a document table cover 12 that covers the document placing plate 11, and a document scanning unit 13 arranged at a lower portion of the document placing plate 11.

The document placing plate 11 is a transparent plate-shaped member for placing a document thereon when scanning the document by the FBS method, and is arranged on an uppermost surface of the device main body 2. A document placing surface of the document placing plate 11 is a document scanning surface 11a (see FIG. 4), and is adapted to the size enabling the document of A4 size to be scanned at a maximum. In the present preferred embodiment, the document placing plate 11 preferably has a rectangular or substantially rectangular shape when seen from above in which a short side is arranged in parallel or substantially parallel to the left and right direction (A direction) and the long side is arranged in parallel or substantially parallel to the depth direction (B direction of FIG. 4).

The document table cover 12 is arranged at an upper portion of the device main body 2. The document table cover 12 is configured to sandwich the document placed on the document placing plate 11 with the document placing plate 11 in a fixed state, and is adapted to be swingable with a hinge (not illustrated) arranged at an end on a rear side of the upper surface of the device main body 2 as a center of swing.

In the present specification, a front surface of the multifunction peripheral 1 refers to a side surface illustrated in FIG. 1 (i.e., side surface of a side on which the operation unit 60 is arranged and on which the user stands to use), and a rear surface of the multifunction peripheral 1 refers to a side surface on a side opposite to the front surface. A width direction or a left and right direction are the left and right direction in FIG. 1, and a depth direction is a direction orthogonal to a plane of drawing in FIG. 1 (i.e., direction from front surface towards rear surface). The left side and the right side of the multifunction peripheral 1 respectively refer to the left side and the right side of FIG. 1.

The document scanning unit 13 is arranged over the uppermost portion of the device main body 2, and includes a light source 14 that irradiates the document with light, mirrors 15a, 15b, 15c to change the optical path of the light reflected from the document, a moving mechanism 15d that moves the light source 14 and the mirrors 15a, 15b, 15c in the scan sub-scanning direction (left and right direction A), a light-gathering lens 16 that converges the light from the mirror 15c, and an imaging element (CCD) 17 that scans the image of the document based on the light from the light-gathering lens 16. The image data scanned by the imaging element 17 is stored in an image memory (not illustrated).

In the present preferred embodiment, the document scanning unit 13 acquires the image data of the document within a scanning region selected according to the size of the document at the time of the scanning process. Specifically, the document scanning unit 13 moves the mirror 15a and the light source 14 along the scan sub-scanning direction A from one end side to the other end side in the short side direction of the placed document by the moving mechanism 15d based on a drive signal from a control unit (not illustrated). Meanwhile, the moving mechanism 15d moves the mirrors 15b and 15c in the scan sub-scanning direction A by a distance of half of the moving distance of the mirror 15a. In the present preferred embodiment, the moving mechanism 15d preferably moves the mirrors and the light source, but the present invention is not limited thereto. For example, the moving mechanism 15d may move the light source and the imaging element.

While the mirror 15a is moved in the scan sub-scanning direction A, the document scanning unit 13 repeats the scanning of the document for every unit pixel in the scan main scanning direction (depth direction B of FIG. 4) from one end side to the other end side of the long side direction of the placed document, and the acquiring of the image data of a partial document for every unit pixel by the imaging element 17. Accordingly, the image data of the entire document including a large number of pixels is obtained at the point in time the movement of the mirror 15a in the scan sub-scanning direction A is completed.

The image data for every pixel constituting the portion of the image of the document is sequentially acquired (or printed) in the main scanning direction by main scanning, and the position of main scanning is moved in the paper handling direction or the feeding direction of the scanner head (i.e., sub-scanning direction) by sub-scanning.

In the present preferred embodiment, a scanning method of a reduction optical method is preferably adopted, but the present invention is not limited thereto, and an equal magnification optical method (contact sensor method) using a CIS sensor may be adopted. Moreover, in the present preferred embodiment, the optical system moving method of a two-carriage method is adopted, but a one-carriage method may also be adopted, and the one-carriage method can be adopted even in the contact sensor method.

The image recording unit 20 includes a photoconductive drum 21 that includes a photoconductive layer on an outer circumferential surface and that swings with a rotation shaft 21a as a center, a charger that uniformly charges the photoconductive layer of the photoconductive drum 21 to a predetermined potential, an exposure 23 that forms an electrostatic latent image on the photoconductive drum 21, a developer 24 that supplies toner to the electrostatic latent image on the photoconductive drum 21 and develops the electrostatic latent image, a transfer roller 25 that transfers the toner image from the photoconductive drum 21 onto the recording paper, a fuser roller 26 that heats and fuses the toner image on the recording paper, paper feed rollers 27a, 27b that feed the recording paper from the paper feed unit 40 to the photoconductive drum 21, a resist roller 28 that aligns the direction of the recording paper, and an exit roller 29 that discharges the recording paper to the discharging unit 50.

The image recording unit 20 is configured to print the image data read from the image memory on the recording paper. The image data includes image data acquired by the image scanning unit 10, and the image data received from outside (facsimile, PC, or the like) through a transmitting/receiving device (not illustrated).

The image recording unit 20 repeats the recording of the partial image in the record main scanning direction along the extending direction of the rotation shaft 21a of the photoconductive drum 21 while moving the recording paper in the record sub-scanning direction with respect to the photoconductive drum 21, to record (print) the entire image based on the image data on the recording paper.

In order to avoid the need for an in-body discharging space 51, to be described later, the above-described components constituting the image recording unit 20 are arranged so as to be stacked mainly in a right side space of the device main body 2 excluding the developer 24, and the like. In other words, a heavy load is arranged on the right side in the device main body 2. Thus, the device main body 2 is configured so that the rigidity on the right side becomes higher to support such a heavy load.

In the present preferred embodiment, a printer of an electrophotographic method (laser scan method or LED head method) is preferably adopted, but the present invention is not limited thereto, and a printer of inkjet method, a thermal printer, and the like may also be adopted, for example.

The document feeding unit (ADF) 30 includes a paper feed tray 31 on which a plurality of documents can be placed, a pickup roller 32 that feeds the document on the paper feed tray 31 towards downstream, a separation roller 33 that separates and supplies the document on the paper feed tray 31 one at a time, a resist roller 34 that aligns the direction of the separated documents, a transport roller 35 that feeds the document towards downstream, an elongated transparent translucent plate 36 having a narrow width on which upper surface the fed document is passed, and an output tray 37 that accommodates the discharged documents. The document feeding unit 30 configures the ADF (Automatic Document Feeder).

The document feeding unit 30 preferably is mainly integrally attached to the document table cover 12, but the translucent plate 36 is arranged slightly spaced apart along an end on the left side of the document placing plate 11.

The paper feed unit 40 includes a paper feed cassette 41 that accommodates a plurality of sheets of recording papers 3 of a size smaller than or equal to a predetermined maximum recording paper size (A4 size in the present example) in a stacked state, and a manual paper feeding tray 43 that accommodates the recording paper of a size smaller than or equal to a predetermined extended size (A3 size in the present example) greater than the maximum recording paper size. In the present preferred embodiment, the recording paper 3 preferably is not a roll paper but a cut paper that is cut to a prescribed size. In the present preferred embodiment, only one paper feed cassette is preferably provided, but the present invention is not limited thereto, and a plurality of paper feed cassettes may be provided, for example.

The paper feed cassette 41 is arranged at the lowermost portion in the device main body 2 to avoid the constituent components of the image recording unit 20 that are arranged in a stacked manner. The paper feed cassette 41 can be inserted into the device main body 2 from the front side towards the rear side of the device main body 2.

The manual paper feeding tray 43 is arranged on the right side of the device main body 2, and can be accommodated or extracted. The manual paper feeding tray 43 constitutes one portion of a side wall on the right side of the device main body 2 in a state accommodated in the device main body 2. In FIG. 2, the manual paper feeding tray 43 is folded and accommodated in the device main body 2.

The discharging unit 50 includes the in-body discharging space 51 provided in the device main body 2 to accommodate the recording paper printed in the image recording unit 20. The in-body discharging space 51 is a space on the left side of the image recording unit 20 arranged in a stacked manner in the longitudinal direction and between the image scanning unit 10 and the paper feed cassette 41. The in-body discharging space 51 is partitioned from the image scanning unit 10 and the image recording unit 20 by a lower side wall 51a of the document scanning unit 13, and an upper side wall 51b and a longitudinal wall 51c of the image recording unit 20, and includes a front side wall and a left side wall of the device main body 2 that are opened. The discharging unit 50 configures the in-body discharging unit.

Next, the scan main scanning direction and the scan sub-scanning direction in the multifunction peripheral 1 of the present preferred embodiment will be described with reference to FIG. 4.

As illustrated in FIG. 4, the document placing plate 11 used in the FBS method and the long translucent plate 36 used in the ADF method configure the uppermost surface of the device main body 2, and are arranged parallel or substantially parallel to each other.

The document placing plate 11 is adapted to the size corresponding to the document of A4 size in the present example, and defines the maximum scanning region in the FBS method. In other words, the maximum document size that can be scanned in the maximum scanning region is A4 size. This maximum scanning region preferably has a rectangular or substantially rectangular shape, where the short side is parallel or substantially parallel to the left and right direction A of the device main body 2 and the long side is parallel or substantially parallel to the depth direction B of the device main body 2. As illustrated in FIG. 4, the maximum scanning range is defined by the length of the long side (scan maximum main scanning length Lm) of the document placing plate 11 and the length of the short side (scan maximum sub-scanning length Lv) of the document placing plate 11.

In contrast, the elongated translucent plate 36 preferably has the same length as the length of the long side of the document placing plate 11, and is arranged parallel or substantially parallel to the depth direction B along the long side of the document placing plate 11.

Therefore, as is apparent from FIG. 4, the multifunction peripheral 1 of the present preferred embodiment is configured such that the width in the left and right direction is shorter than the depth. In other words, the left and right width is narrower and compact as compared to the conventional A3 machine, and the installing area is reduced.

As described above, the mirror 15a and the light source 14 of the image scanning unit 10 are configured to move in the left and right direction A in the device main body 2 so that the maximum scanning range can be scanned. Therefore, the scan sub-scanning direction in the FBS method is the direction A and the scan main scanning direction is the direction B.

When the document is scanned by the ADF method, the document is passed above the translucent plate 36 by the document feeding unit (ADF) 30. In this case, the mirror 15a and the light source 14 are located below the translucent plate 36 in the stationary state, and the image scanning unit 10 scans the image of the document through the translucent plate 36. Thus, the scan main scanning direction and the scan sub-scanning direction by the ADF method are the direction B and the direction A, respectively, similarly to the FBS method.

Next, the record main scanning direction and the record sub-scanning direction in the multifunction peripheral 1 of the present preferred embodiment will be described with reference to FIG. 3 and FIG. 5.

As illustrated in FIG. 5, the paper feed cassette 41 of the paper feed unit 40 accommodates the recording paper 3 such that the long side of the recording paper 3 having an accommodatable maximum recording paper size is parallel or substantially parallel to the depth direction B of the device main body 2, and the short side is parallel or substantially parallel to the left and right direction A of the device main body 2. The recording paper 3 is fed to the image recording unit 20 by the paper feed roller 27a along the short side direction, as illustrated with an arrow C. In the present preferred embodiment, the maximum recording paper size is the same size as the maximum document size.

As illustrated in FIG. 3, the photoconductive drum 21 of the image recording unit 20 is arranged such that the rotation shaft 21a is parallel or substantially parallel to the depth direction B of the device main body 2. The extending direction of the rotation shaft 21a is parallel or substantially parallel to the long side direction of the recording paper 3 of maximum recording paper size accommodated in the paper feed cassette 41.

Therefore, the recording paper 3 of maximum recording paper size makes contact with the photoconductive drum 21 from one long side with both short sides along the advancing direction when being supplied to the image recording unit 20. The recording paper 3 is passed between the photoconductive drum 21 and the transfer roller 25 to have the image transferred, and thereafter, the image is fused by the fuser roller 26. Therefore, the recording paper 3 of maximum recording paper size fed from the paper feed cassette 41 has the long side direction (i.e., extending direction of rotation shaft 21a) as the record main scanning direction and the short side direction (i.e., paper handling direction) as the record sub-scanning direction. A record maximum main scanning length 1m of the recording paper 3 is the length of the long side, and a record maximum sub-scanning length 1v is the length of the short side.

Therefore, in the present preferred embodiment, the scan main scanning direction and the record main scanning direction are preferably parallel or substantially parallel to each other.

When adopting a method other than the electrophotographic method, for example, when adopting the inkjet method, the direction the inkjet head moves at the time of recording matches the extending direction of the rotation shaft 21a, and hence the long side direction of the recording paper 3 of maximum recording paper size becomes the record main scanning direction, similarly to the above.

Next, the advantageous effects of the multifunction peripheral 1 of the present preferred embodiment will be described.

First, a case in which the user copies the document of A4 size (maximum document size) through the FBS method will be described. In this case, the user places the document of A4 size on the document scanning surface 11a and operates the operation unit 60, so that the copying machine 1 executes the scanning process of the image of the document and the recording process.

The control unit determines the size of the document with a document size sensor (not illustrated), activates the document scanning unit 13 to scan the image of the document, and retrieves the scanned image data into the image memory.

In the present preferred embodiment, since the scan main scanning direction is arranged to extend along the long side of the document and the scan sub-scanning direction is arranged to extend along the short side of the document, the distance of moving the mirror and the like towards the sub-scanning direction becomes short. The time required for the scanning process thus can be reduced and the process can be promptly carried out. Furthermore, since the activation time (per one sheet of document) of the light source 14 and the moving mechanism 15d is short, the frequency of replacing or performing maintenance on the light source 14 and the mechanical components can be reduced.

At substantially the same time as the retrieval of the image data, the control unit activates the image recording unit 20 and feeds the recording paper of A4 size from the paper feed cassette 41 to the image recording unit 20 to print the image on the recording paper.

In this case, in the present preferred embodiment, the record main scanning direction is arranged to extend along the long side of the recording paper and the record sub-scanning direction is arranged to extend along the short side of the recording paper, and thus the time during which the recording paper passes the photoconductive drum 21 of the image recording unit 20 becomes short. Thus, the time during which the recording paper is processed in the image recording unit 20 can be reduced, and the recording process can be promptly carried out. Furthermore, the contacting time or the contacting length of the photoconductive drum 21 and the recording paper becomes short per one sheet of recording paper and the activation time of the drive mechanism becomes short. As a result, the frequency of replacing or performing maintenance on the photoconductive drum 21 and the drive mechanism can be reduced.

In the present preferred embodiment, the FBS method corresponds to the image scanning process of the document of a size up to the maximum document size (A4 in the present example). This is because most of the document sizes generally used is the maximum document size (A4 size), and the scanning process of the document of a size (e.g., A3 size) exceeding the maximum document size is normally unnecessary. Accordingly, in the present preferred embodiment, since the size of the device, in particular, the installing area of the device is reduced by limiting the document scanning process by the FBS method to the A4 size, the device can be used in small-scale offices and households.

As described above, the size of the document generally used is mostly A4 size, but a need to copy the document of A3 size sometimes occurs at low frequency. In this case, in the copying machine 1 of the present preferred embodiment, the document of A3 size can be copied by the ADF method, as will be described below.

A case in which the user copies the document of A3 size by the ADF method will be described. In this case, the user places the document of A3 size on the paper feed tray 31 of the ADF 30, extracts the manual paper feeding tray 43 and places the recording paper of A3 size on the manual paper feeding tray 43, and then operates the operation unit 60 so that the copying machine 1 executes the scanning process and the recording process of the image of the document.

The control unit determines the size of the document with the document size sensor (not illustrated), activates the ADF 30 and the document scanning unit 13 to scan the image of the document and retrieves the scanned image data in the image memory.

At substantially the same time as the retrieval of the image data, the control unit feeds the recording paper of A3 size from the manual paper feeding tray 43 to the image recording unit 20, and prints the image on the recording paper in the image recording unit 20.

In the present preferred embodiment, the maximum document size that can be scanned by the FBS method is A4, but the document of A3 size, which is greater than the A4 size, can be scanned by the ADF method, and the document of A3 size can be copied onto the recording paper of A3 size supplied from the manual paper feeding tray 43. Therefore, in the present preferred embodiment, the document of greater size as compared to the size of the document scanning surface 11a used in the FBS method can be copied. In other words, the multifunction peripheral 1 of the present preferred embodiment can respond to the scanning process of A3 size and the device main body 2 may become a compact size corresponding to the A4 size.

In the above description, the case of copying from the document to the recording paper at the same magnification has been described, but the present invention is not limited thereto, and the document may be copied at enlarged or reduced magnification by the setting of the operation unit 60. In this case, in the multifunction peripheral 1 of the present preferred embodiment, the recording paper of a size different from the scanned document is supplied from the paper feed cassette 41 or the manual paper feeding tray 43, and the enlarged or reduced image can be recorded (printed) on such recording paper.

Moreover, in the above description, the case of scanning the document of A3 size by the ADF method has been described, but the present invention is not limited thereto, and the document of other sizes including the document of maximum document size (A4 size) may be scanned by the ADF method.

Thus, the multifunction peripheral 1 of the present preferred embodiment can scan the document of a size up to the A3 size, similarly to the A3 machine, while having the same installing area as the A4 machine. Consequently, miniaturization is achieved according to the actual condition such as small-scale office and the like, and sufficient practicability can be provided.

The multifunction peripheral 1 of the present preferred embodiment can share the components with the A3 machine, so that the manufacturing cost can be reduced.

The multifunction peripheral 1 of the present preferred embodiment has the short side of the rectangular or substantially rectangular document scanning surface 11a along the left and right direction A of the device main body 2, and the long side along the depth direction B. The scan main scanning direction extends along the depth direction B and the scan sub-scanning direction extends along the left and right direction A. Furthermore, the ADF 30 can be arranged along the end in the left and right direction of the device main body 2 so as to feed the document in the scan sub-scanning direction. According to such a configuration, when paper jam occurs in the ADF 30, the user can resolve the paper jam situation by easily accessing the ADF 30 from the front side, thus ensuring satisfactory maintenance performance. In the present example, the ADF 30 is arranged at the left end but the ADF 30 may be arranged at the right end.

If configured such that the long side of the document scanning surface 11a extends along the left and right direction of the device main body 2, and the scan main scanning direction extends in the long side direction of the document scanning surface 11a, the ADF 30 is arranged at the end on the rear side of the device main body 2. In this case, when paper jam occurs in the ADF 30, it is difficult for the user to access the ADF 30, thus degrading the maintenance performance.

In the preferred embodiment described above, the multifunction peripheral 1 preferably has the size of the document scanning surface 11a adapted to the A4 size, but the present invention is not limited thereto, and the size of the document scanning surface 11a may be adapted to other sizes. In other words, the multifunction peripheral 1 of the present preferred embodiment may be configured to adapt the size of the document scanning surface 11a to, for example, Letter size (8.5× 11 inches), Legal size (8.5×14 inches), Ledger size (11×17 inches), B4 size, A3 size, and the like. In this case, the document scanning surface 11a can be configured such that the long side of the recording paper extends along the depth direction B and the short side extends along the left and right direction A in any size.

If configured such that the maximum document size is Letter size or B4 size as described above, the document of Ledger size and B3 size can be scanned by the ADF method.

With respect to the standard of the paper size illustrated in the present preferred embodiment, the A3 and A4 sizes are International Organization for Standardization (ISO) and the B4 size is ISO or Japanese Industrial Standards (JIS), but preferred embodiments of the present invention can be used with paper sizes that do not have a formal standard.

Figure 6:
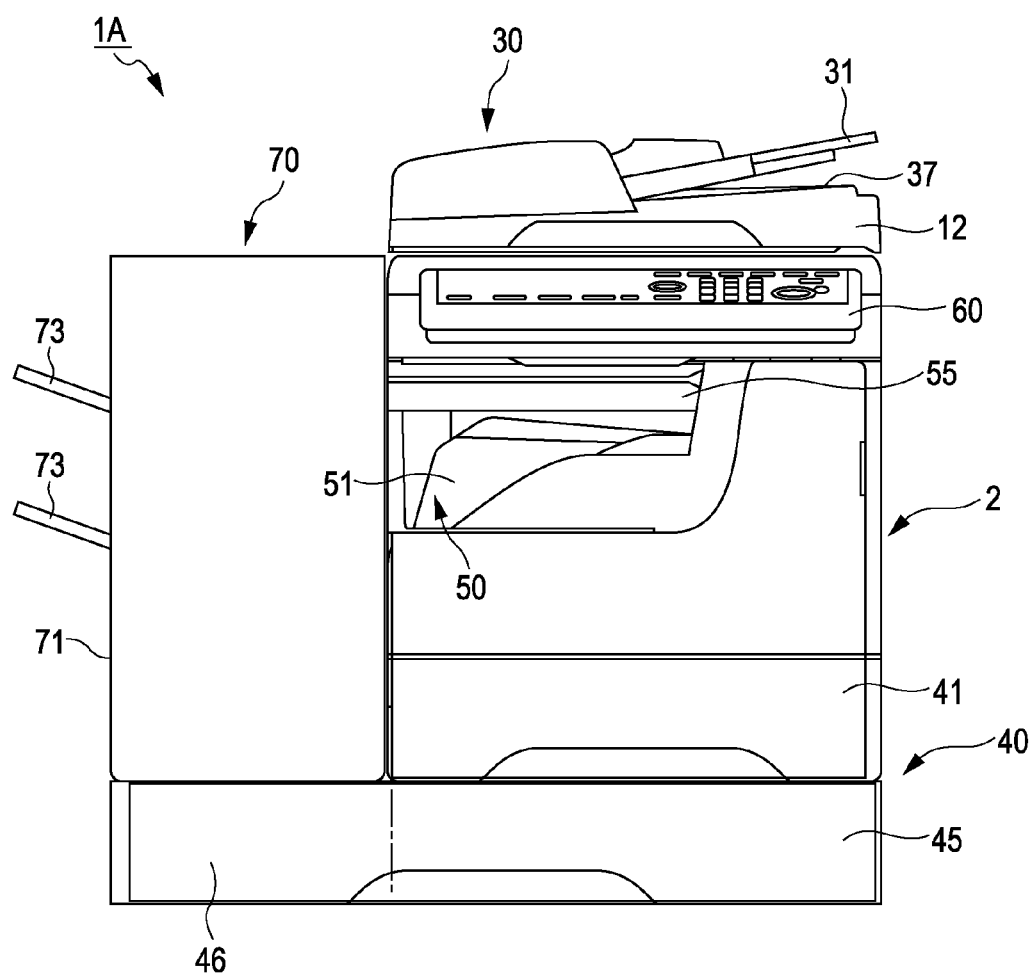
FIG. 6 is a front view of an image processing device according to a second preferred embodiment of the present invention.
Figure 7:
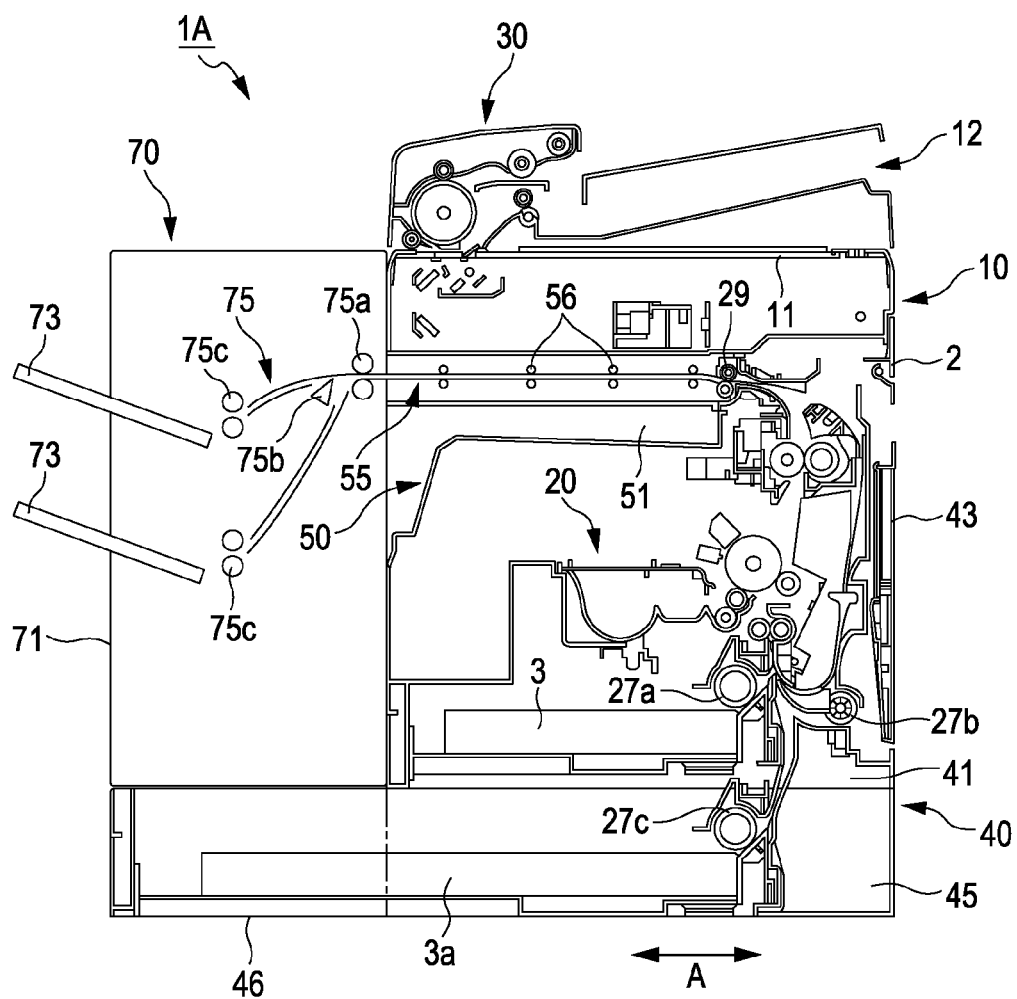
FIG. 7 is an explanatory view seen from a front side illustrating a structure of the image processing device according to the second preferred embodiment of the present invention.

Next, a second preferred embodiment of the present invention will be described with reference to FIG. 6 and FIG. 7. FIG. 6 is a front view of an image processing device, and FIG. 7 is an explanatory view seen from a front side illustrating a structure of the image processing device. The description redundant with the first preferred embodiment will be omitted, and the differing structures will be mainly described.

As illustrated in FIG. 6, a multifunction peripheral 1A of the present preferred embodiment has a configuration in which a second paper feed cassette 45 and a finisher device 70 are preferably added to the multifunction peripheral 1 of the first preferred embodiment.

A relay unit 55 is attached to an upper side portion of the in-body discharging space 51 of the discharging unit 50. As illustrated in FIG. 7, the relay unit 55 transports the recording paper discharged from the exit roller 29 of the image recording unit 20 to the finisher device 70, and includes a plurality of transport rollers 56 that are motor driven.

The second paper feed cassette 45 is attached to the lower portion of the paper feed cassette 41. The paper feed cassette 41 accommodates the recording paper of a size up to the A4 size, which is the maximum document size, and the additional second paper feed cassette 45 can accommodate the recording paper of a size of an extended size (A3 size) greater than the maximum document size. Therefore, the second paper feed cassette 45 has a larger size than the paper feed cassette 41. In the above description, the maximum recording paper size accommodated in the paper feed cassette 41 is described as the A4 size and the maximum recording paper size accommodated in the second paper feed cassette 45 is described as the A3 size. However, the present invention is not limited thereto, and the maximum recording paper size accommodated in the paper feed cassette 41 and the second paper feed cassette 45 may be provided in the following combinations. For example, the combinations may be the Letter size in the paper feed cassette 41 and the A3 size in the second paper feed cassette 45, the Letter size in the paper feed cassette 41 and the Ledger size in the second paper feed cassette 45, or the A4 size in the paper feed cassette 41 and the Ledger size in the second paper feed cassette 45.

Specifically, the second paper feed cassette 45 accommodates the recording paper such that the short side direction of the recording paper of A3 size extends along the depth direction B of the device main body 2 and the long side direction extends along the left and right direction A of the device main body 2. Therefore, when the paper feed cassettes 41 and 45 respectively accommodate the recording paper of an accommodatable maximum size, the length (short side of A3) in the depth direction B of the recording paper 3a in the second paper feed cassette 45 is the same as the length (long side of A4) in the depth direction B of the recording paper 3 in the paper feed cassette 41. Thus, the lengths in the depth direction B of the paper feed cassettes 41 and 45 are configured to be the same.

When the paper feed cassettes 41 and 45 respectively accommodate the recording paper of an accommodatable maximum size, the length (long side of A3) in the left and right direction A of the recording paper 3a in the second paper feed cassette 45 is twice the length (short side of A4) in the left and right direction A of the recording paper 3 in the paper feed cassette 41.

Thus, the length in the left and right direction A of the second paper feed cassette 45 is longer than the length in the left and right direction A of the paper feed cassette 41. In the multifunction peripheral 1A illustrated in FIG. 6, therefore, the second paper feed cassette 45 projects out in the left direction farther than the paper feed cassette 41 and the device main body 2 when seen from above. The finisher device 70 is mounted on a projecting portion 46 of the second paper feed cassette 45 projecting out in the left and right direction A than the device main body 2.

As illustrated in FIG. 7, a paper feed roller 27c that takes out the recording paper 3a in the second paper feed cassette 45 is preferably added to the image recording unit 20. The recording paper 3a accommodated in the second paper feed cassette 45 is sent to the image recording unit 20 when the paper feed roller 27c is activated by the drive signal of the control unit.

The finisher device 70 processes the recording paper discharged from the image recording unit 20 and transported through the relay unit 55. The finisher device 70 includes a vertically long housing 71 having a rectangular or substantially rectangular outer shape, a plurality of output trays 73 arrayed in a vertical direction in the housing 71, and a switching guide mechanism 75 that allocates the output document to the plurality of output trays 73. An upper surface of the housing 71 is set to substantially the same height as the upper surface of the device main body 2 (i.e., upper surface of document placing plate 11).

The switching guide mechanism 75 includes a drive roller 75*a*, a switching guide 75*b*, and a plurality of exit rollers 75*c* corresponding to each output tray 73, which are motor driven. A transport path is located between the switching guide 75*b* and each exit roller 75*c*.

When the document is transported, the switching guide mechanism 75 of the finisher device 70 is activated based on a drive signal from the control unit. The switching guide mechanism 75 feeds the output document to the desired output tray 73 by having the switching guide 75*b* switch, for every output document, the transport path to feed the output document.

In the preferred embodiment of FIG. 6 and FIG. 7, the case in which only two output trays 73 are arranged is illustrated to facilitate the understanding, but the present invention is not limited thereto, and three or more output trays may be provided, for example.

In the present preferred embodiment, the ADF 30 is arranged at the left end of the upper surface of the device main body 2 but is not located at the upper portion of the finisher device 70. In other words, the ADF 30 is not arranged at least at a position that inhibits the rising/lowering operation in the upward direction of the output tray 73. Therefore, in the present preferred embodiment, the output tray 73 is maintained at a fixed height, but the present invention is not limited thereto, and the output document may be allocated by having the multi-stage output tray 73 raised/lowered in the vertical direction. When providing such a raising/lowering allocation mechanism, at least the upper output tray 73 in the multi-stage output tray 73 is moved upward beyond the document placing plate 11.

In the present preferred embodiment, the finisher device 70 has a function of sorting output documents, but the present invention is not limited thereto, and may have functions such as stapling, hole punching, and the like.

Therefore, in the present preferred embodiment, since the second paper feed cassette 45 that accommodates the recording paper of an extended size (A3 size) greater than the maximum recording paper size (A4 size) is provided, the portion 46 that projects out from the device main body 2 is provided, and the finisher device 70 can be mounted on the projecting portion 46. In other words, the multifunction peripheral 1A of the present preferred embodiment can include the finisher device 70 although it has the same installing area as the A3 machine.

Therefore, in the multifunction peripheral 1A of the present preferred embodiment, the entire device can be made compact without further increasing the installing area by adding the finisher device as in the conventional A3 machine.

Although the multifunction peripheral 1A of the present preferred embodiment has the same installing area as the A3 machine and the scanning process of the document of A3 size can be carried out, the multifunction peripheral 1A can have the size of the image scanning unit 10 to be the same size as the A4 machine. The manufacturing cost thus can be reduced.

In the multifunction peripheral 1A of the present preferred embodiment, since the finisher device 70 independent from the device main body 2 is adjacently arranged, the height of the finisher device 70 is not limited by the device main body 2. The finisher device 70 thus can have sufficient functions without the various types of functions and the number of output trays being limited due to height limitation.

In the multifunction peripheral 1A of the present preferred embodiment, since the ADF 30 and the finisher device 70 are both arranged on the same side (left side in the present example) in the left and right direction of the device main body 2, the document and the recording paper can be taken out from the ADF 30 and the finisher device 70 on the same side of the device main body 2. The ADF and the finisher device 70 may be arranged on the right side of the device main body 2.

Next, an alternative preferred embodiment of the second preferred embodiment will be described with reference to FIG. 8.

Figure 8:
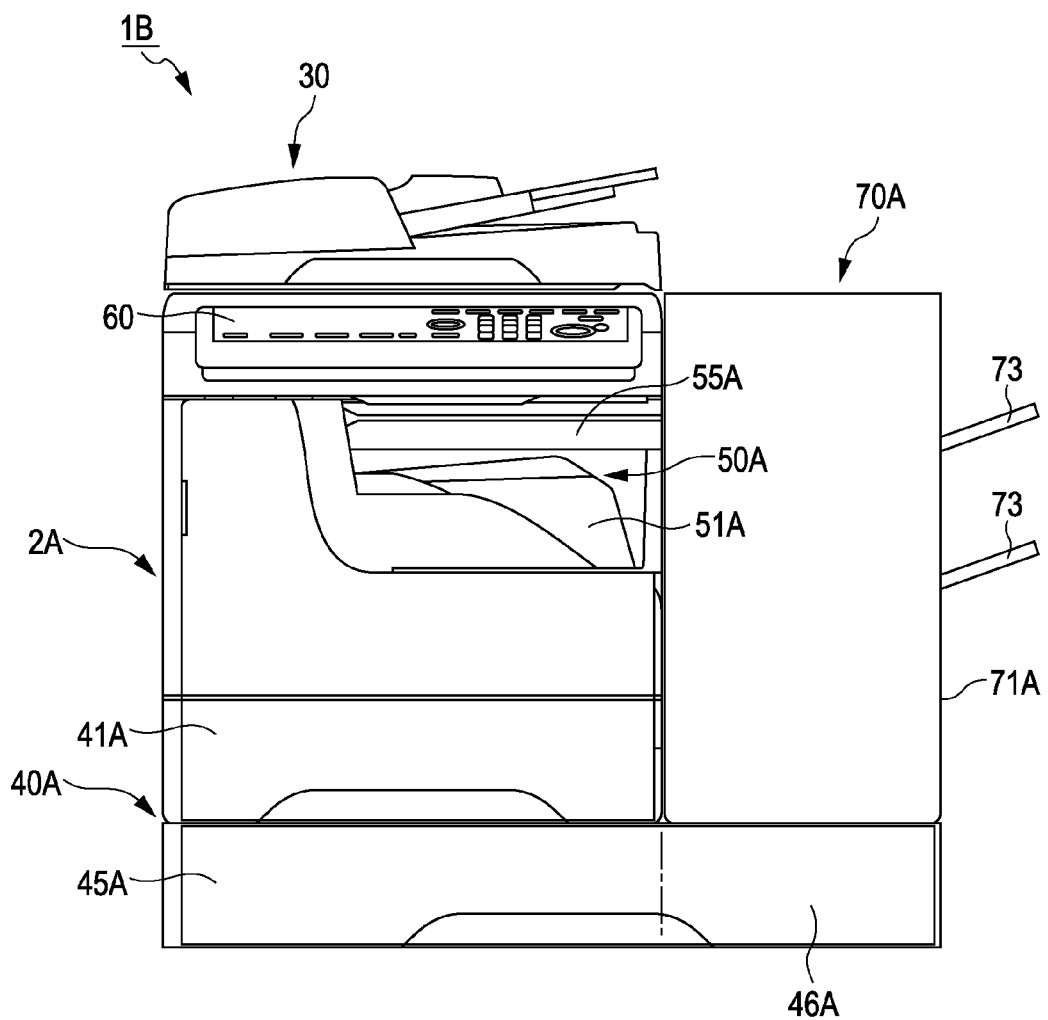
FIG. 8 illustrates a modified example of the image processing device according to the second preferred embodiment of the present invention.

In a multifunction peripheral 1B illustrated in FIG. 8, a device main body 2A is configured to be symmetric with the device main body 2 (excluding image scanning unit 10) of the multifunction peripheral 1 and 1A of the preferred embodiments described above. A discharging unit 50A and a relay unit 55A are also symmetric to the discharging unit 50 and the relay unit 55.

Similarly, a paper feed unit 40A (paper feed cassette 41A, second paper feed cassette 45A) is arranged to be symmetric to the paper feed unit 40 (paper feed cassette 41, second paper feed cassette 45). Thus, a projecting portion 46A is also located on the right side of the device main body 2A, and a finisher device 70A (symmetric to finisher device 70) is also located on the right side of the device main body 2A.

In the present preferred embodiment, the ADF 30 and an in-body discharging space 51A of the discharging unit 50A are respectively arranged on opposite sides in the left and right direction of the device main body 2A (in the present example, ADF 30 is on the left side and the in-body discharging space 51A is on the right side). Thus, since the ADF 30 is arranged at an upper portion of a structural portion having high rigidity of the device main body 2A, the rigidity of the entire device can be improved. A configuration in which the ADF is arranged on the right side and the in-body discharging space is arranged on the left side may be adopted.

Next, another alternative preferred embodiment of the second preferred embodiment will be described with reference to FIG. 9.

Figure 9:
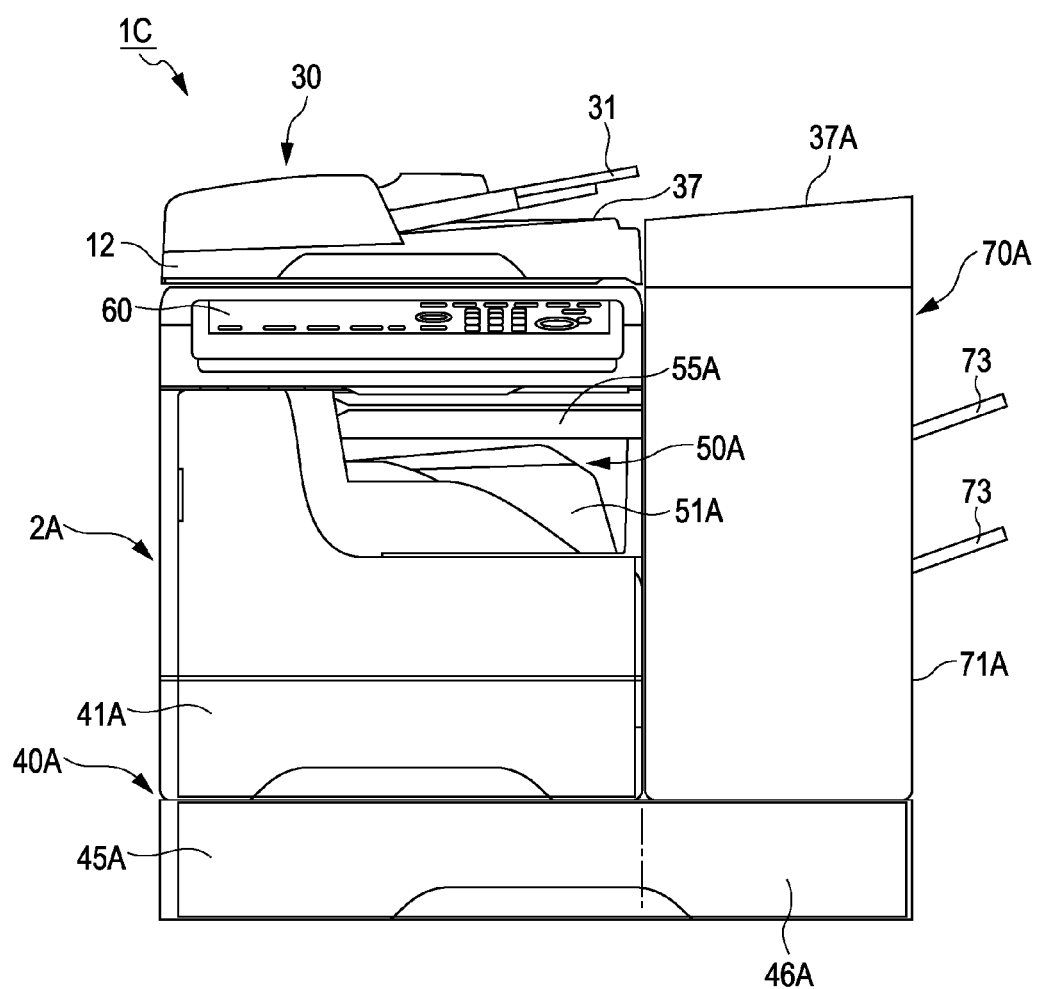
FIG. 9 is another modified example of the image processing device according to the second preferred embodiment of the present invention.

A multifunction peripheral 1C illustrated in FIG. 9 is further improved from the multifunction peripheral 1B illustrated in FIG. 8. The multifunction peripheral 1C includes an extending output tray 37A at an upper portion of a housing 71A of the finisher device 70A. The extending output tray 37A is adjacent to the output tray 37 of the ADF 30, and is arranged to continue thereto. The extending output tray 37A is arranged such that a tilt of the document placing surface thereof is the same angle as the tilt of the document placing surface of the output tray 37, and is configured to extend a document placing region of the output tray 37.

For example, when scanning the document of A3 size with the ADF 30, the output document of A3 size may not be accommodated with only the output tray 37. In the present preferred embodiment, therefore, an upper space of the finisher device 70A is effectively used to provide the extending output tray 37A in such a space. The document placing region is enlarged by the extending output tray 37A, so that the document of A3 size can be reliably accommodated.

In the present preferred embodiment, the extending output tray 37A is arranged on the finisher device 70A, but an extending paper feed tray may be further arranged to enlarge the document placing region of the paper feed tray 31 of the ADF 30, or only one of the extending output tray 37A and the extending paper feed tray may be arranged.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An image processing device comprising:
   an image scanning unit that scans an image of a document by repeating scanning of an image of a document in a scan main scanning direction while moving a moving mechanism in a scan sub-scanning direction with respect to the document placed on a document scanning surface, the document scanning surface having a size adapted to a maximum document size that can be scanned by a scan maximum main scanning length and a scan maximum sub-scanning length that is shorter than the scan maximum main scanning length;
   a first paper feed cassette in which recording paper of a size up to a first size is accommodated, the recording paper of the first size being accommodated so that a long side of the recording paper is parallel or substantially parallel to a record main scanning direction, the record main scanning direction being parallel or substantially parallel to the scan main scanning direction; and
   an image recording unit that records the image on the recording paper by repeating recording of the image in the record main scanning direction while moving the recording paper supplied from the first paper feed cassette in a record sub-scanning direction; wherein
   the first size is the same size as the maximum document size.

2. The image processing device according to claim 1, wherein the scan main scanning direction and the record main scanning direction extend along a depth direction from a front surface of the image processing device, on which side a user stands during use, towards a rear surface.

3. The image processing device according to claim 2, further comprising an operation unit that inputs or displays setting information and is arranged on a short side in the document scanning surface.

4. The image processing device according to claim 1, wherein the maximum document size and the first size are a Letter size or an A4 size.

5. The image processing device according to claim 1, further comprising an automatic document feeder that transports a document larger than the maximum document size in the scan sub-scanning direction with respect to the image scanning unit.

6. The image processing device according to claim 5, further comprising a manual paper feeding tray that transports recording paper larger than the recording paper of the first size that can be accommodated in the first paper feed cassette in the record sub-scanning direction with respect to the image recording unit.

7. The image processing device according to claim 1, further comprising a second paper feed cassette that accommodates recording paper of a size up to a second size, which is larger than the maximum document size, and includes a projecting portion that projects out in a horizontal direction farther than a device main body including the image scanning unit and the image recording unit in plan view.

8. The image processing device according to claim 7, further comprising:
   an automatic document feeder, arranged at an upper portion of the document scanning surface, that causes the image scanning unit to scan the image of the document by transporting the document; and
   a finisher device, arranged at an upper portion of the projecting portion, that processes the recording paper discharged from the image recording unit.

9. The image processing device according to claim 8, wherein the second paper feed cassette is configured to supply the recording paper of the second size to the image recording unit when the image scanning unit scans the image of the document of the second size transported from the automatic document feeder.

10. The image processing device according to claim 8, wherein
    the document scanning surface is arranged such that a longitudinal direction of the document scanning surface extends along the depth direction from a front surface of the image processing device, on which side a user stands during use, towards a rear surface; and
    the projecting portion projects out to one side in a left and right direction of the device main body facing the front surface of the image processing device.

11. The image processing device according to claim 8, wherein the first size is a Letter size or an A4 size, and the second size is a Ledger size or an A3 size.

12. The image processing device according to claim 8, wherein the automatic document feeder and the finisher device are both arranged on the same side in the left and right direction facing the front surface of the device main body.

13. The image processing device according to claim 8, wherein
    the automatic document feeder is arranged on one end side in the left and right direction facing the front surface of the device main body; and
    an in-body discharging space that accommodates the recording paper discharged from the image recording unit is arranged on the other end side of the device main body.

14. The image processing device according to claim 8, wherein
    the automatic document feeder is arranged on one end side in the left and right direction facing the front surface of the device main body; and
    the finisher device is arranged on the other end side.

15. The image processing device according to claim 14, wherein
    the automatic document feeder includes at least a paper feed tray or an output tray; and
    the finisher device includes an extending paper feed tray or an extending output tray that extends a document placing region of the paper feed tray or the output tray.

16. The image processing device according to claim 14, wherein
    the finisher device includes an output tray; and
    the output tray includes a downstream end in a paper exit direction of the recording paper that is opened.

17. The image processing device according to claim 1, wherein
    the image recording unit includes a photoconductive drum that rotates about a rotation shaft; and
    the record main scanning direction extends along the rotation shaft of the photoconductive drum.

18. An image processing device comprising:
    an image scanning unit that scans an image of a document by repeating scanning of an image of a document in a scan main scanning direction while moving a moving mechanism in a scan sub-scanning direction with respect to the document placed on a document scanning surface, which defines a maximum document size that can be scanned by a scan maximum main scanning length and a scan maximum sub-scanning length that is shorter than the scan maximum main scanning length;

a first paper feed cassette in which recording paper of a size up to a first size is accommodated, the recording paper of the first size being accommodated so that a long side of the recording paper is parallel or substantially parallel to a record main scanning direction, the record main scanning direction being parallel or substantially parallel to the scan main scanning direction;

an image recording unit that records the image on the recording paper by repeating recording of the image in the record main scanning direction while moving the recording paper supplied from the first paper feed cassette in a record sub-scanning direction; and a manual paper feeding tray that transports at least one sheet of recording paper having a size larger than a size of the document scanning surface.

* * * * *